(12) United States Patent
Kawadahara

(10) Patent No.: US 11,460,447 B2
(45) Date of Patent: Oct. 4, 2022

(54) INSPECTION APPARATUS

(71) Applicant: Kioxia Corporation, Minato-ku (JP)

(72) Inventor: Sho Kawadahara, Yokkaichi (JP)

(73) Assignee: Kioxia Corporation, Minato-ku (JP)

( * ) Notice: Subject to any disclaimer, the term of this patent is extended or adjusted under 35 U.S.C. 154(b) by 310 days.

(21) Appl. No.: 16/815,064

(22) Filed: Mar. 11, 2020

(65) Prior Publication Data

US 2021/0072191 A1    Mar. 11, 2021

(30) Foreign Application Priority Data

Sep. 9, 2019 (JP) .............. JP2019-163968

(51) Int. Cl.
*G01N 29/26* (2006.01)
*G01N 29/22* (2006.01)
*G01N 29/06* (2006.01)
*G01N 29/265* (2006.01)
*G01N 29/27* (2006.01)
*G01N 29/34* (2006.01)
(Continued)

(52) U.S. Cl.
CPC .......... *G01N 29/26* (2013.01); *G01N 29/043* (2013.01); *G01N 29/06* (2013.01); *G01N 29/225* (2013.01); *G01N 29/265* (2013.01); *G01N 29/27* (2013.01); *G01N 29/28* (2013.01); *G01N 29/34* (2013.01); *G01N 29/348* (2013.01); *G01N 29/42* (2013.01); *G01N 2291/015* (2013.01); *G01N 2291/0231* (2013.01); *G01N 2291/106* (2013.01); *G01N 2291/2697* (2013.01)

(58) Field of Classification Search
CPC ...... G01N 29/26; G01N 29/043; G01N 29/06; G01N 29/225; G01N 29/265; G01N 29/27; G01N 2291/0231; G01N 2291/106; G01N 29/041; G01N 29/28; G01N 29/34; G01N 29/42; G01N 2291/15; G01N 2291/2697; G01N 29/348
USPC .......................................... 73/641
See application file for complete search history.

(56) References Cited

U.S. PATENT DOCUMENTS 5,476,011 A * 12/1995 Cornforth .............. G01N 29/26
  73/159
5,803,334 A *  9/1998 Patel .................. B65H 23/0204
  226/45
(Continued)

FOREIGN PATENT DOCUMENTS

JP   05-206242 A   8/1993
JP   07-161596 A   6/1995
(Continued)

*Primary Examiner* — Lisa M Caputo
*Assistant Examiner* — Rose M Miller
(74) *Attorney, Agent, or Firm* — Oblon, McClelland, Maier & Neustadt, L.L.P.

(57) ABSTRACT

According to one embodiment, there is provided an inspection apparatus including a first stage, a second stage, an ultrasonic oscillator, and an ultrasonic collector. The first stage includes a first main face. The second stage includes a second main face opposed to the first main face. The ultrasonic oscillator is disposed in a first region. The first region includes the first main face. The first region further includes a region inside the first stage. The ultrasonic collector is disposed in a second region. The second region includes the second main face. The second region further includes a region inside the second stage.

10 Claims, 12 Drawing Sheets

(51) Int. Cl.
*G01N 29/04* (2006.01)
*G01N 29/28* (2006.01)
*G01N 29/42* (2006.01)

(56) References Cited

U.S. PATENT DOCUMENTS

| | | |
|---|---|---|
| 6,047,600 A | 4/2000 | Ottosson et al. |
| 2006/0048577 A1* | 3/2006 | Haque ...................... G01D 5/48 |
| | | 73/645 |
| 2007/0022815 A1* | 2/2007 | Kim ...................... G01N 29/223 |
| | | 73/628 |
| 2011/0061465 A1 | 3/2011 | Kraemer |
| 2020/0116672 A1* | 4/2020 | Fukumoto .......... G01N 29/2487 |

FOREIGN PATENT DOCUMENTS

| | | |
|---|---|---|
| JP | 2000-283966 A | 10/2000 |
| JP | 2008-180523 A | 8/2008 |
| JP | 2011-082453 A | 4/2011 |
| JP | 2011-519026 A | 6/2011 |
| JP | 2011-258850 A | 12/2011 |

* cited by examiner

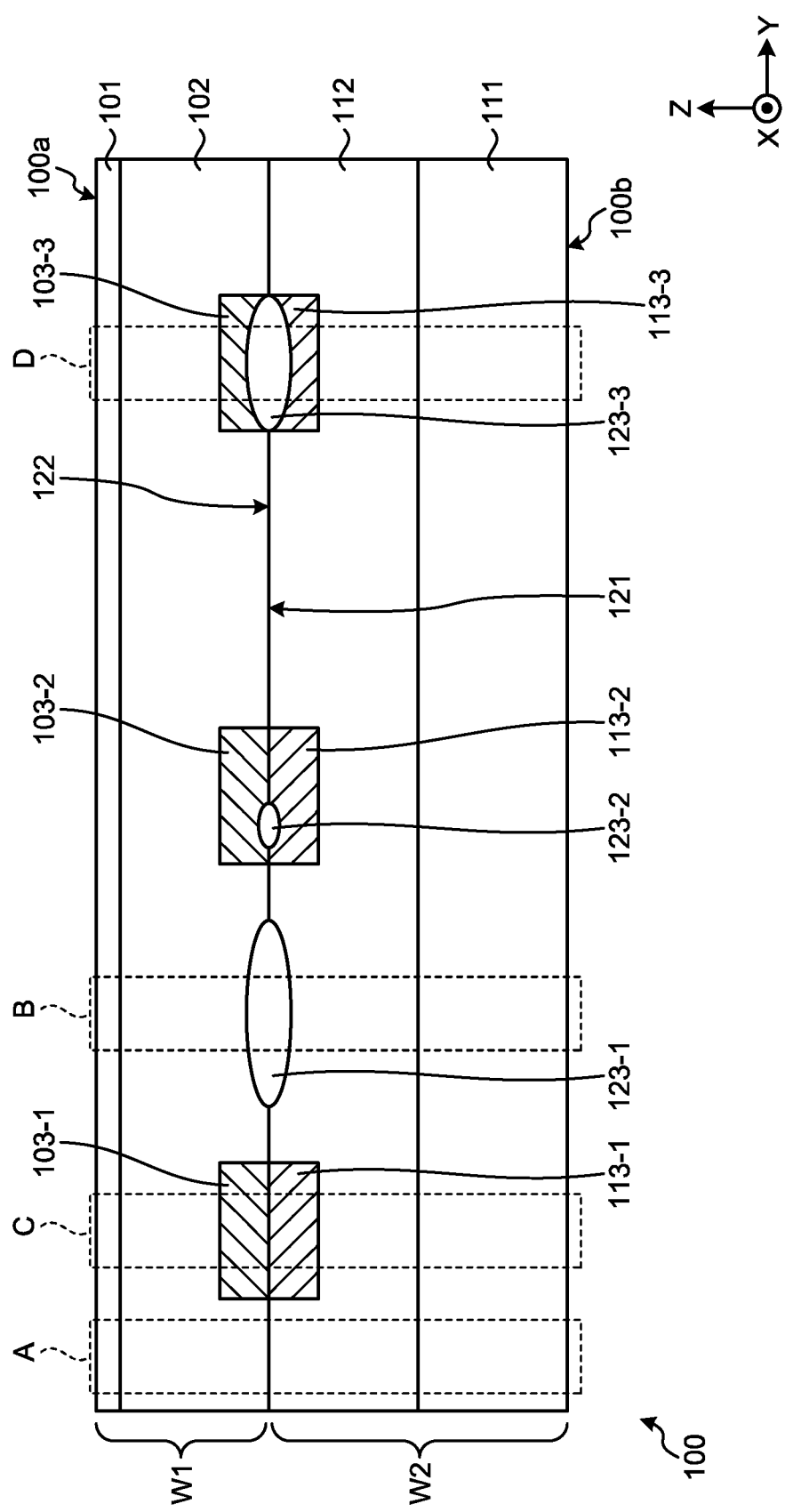

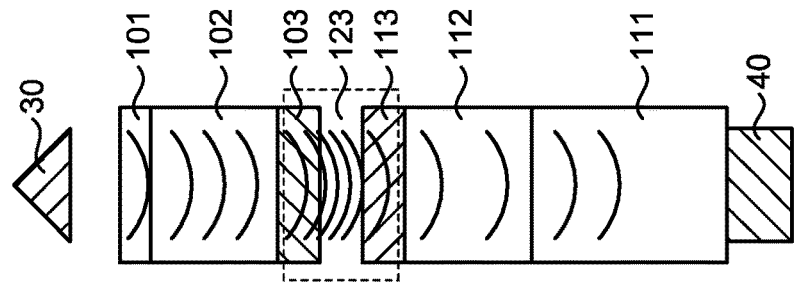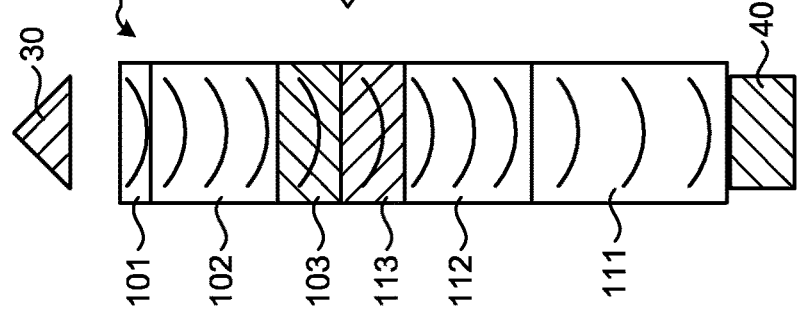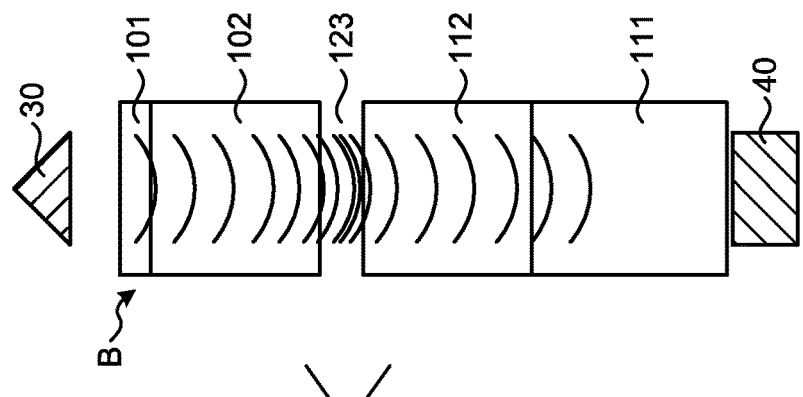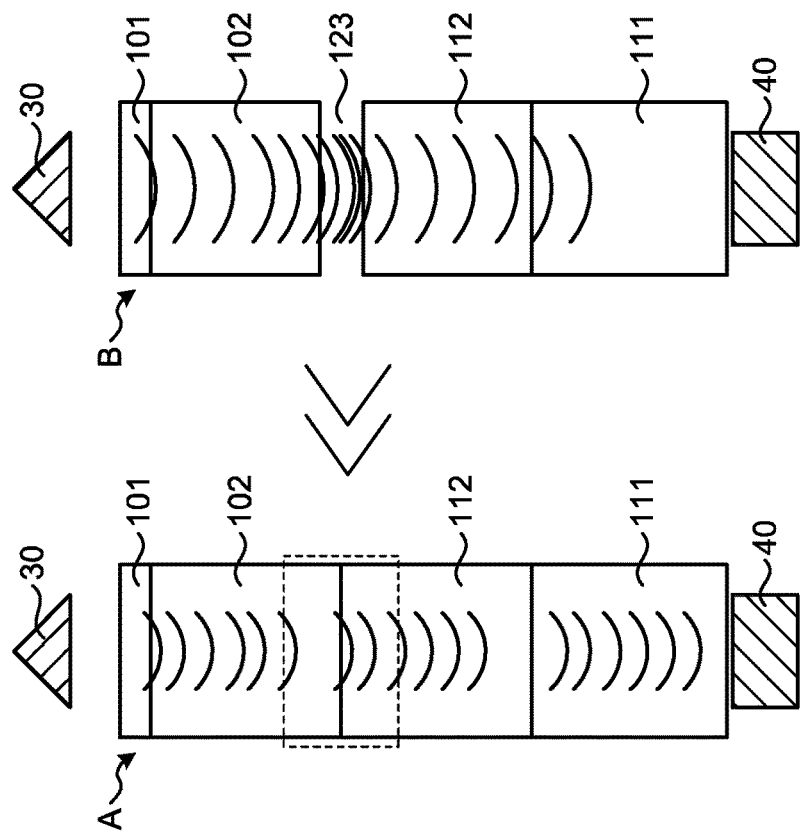

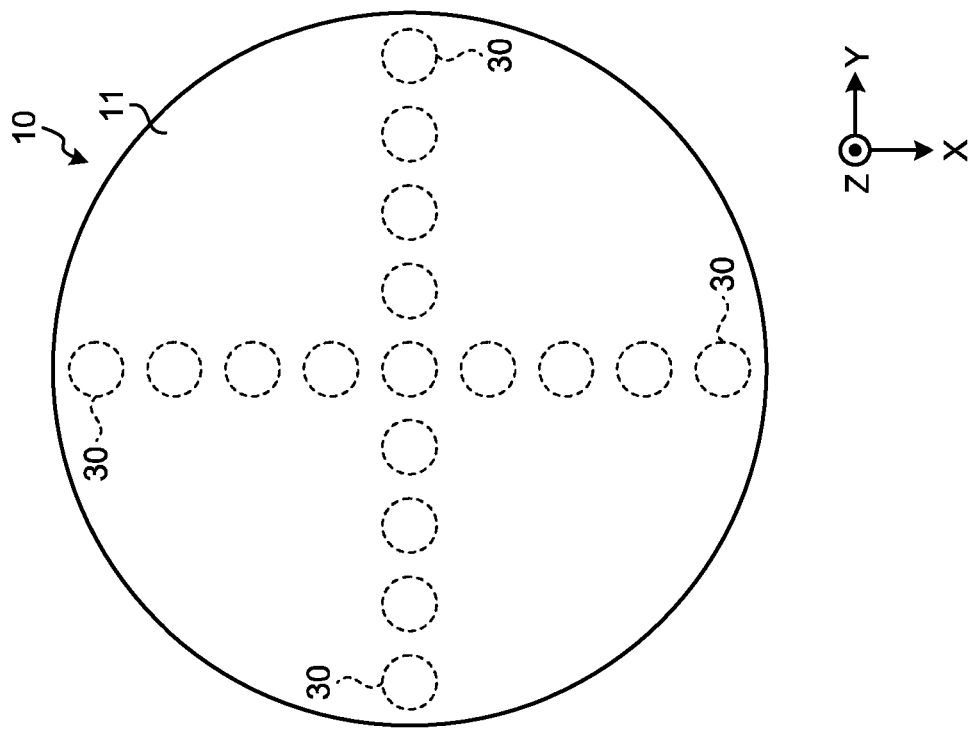
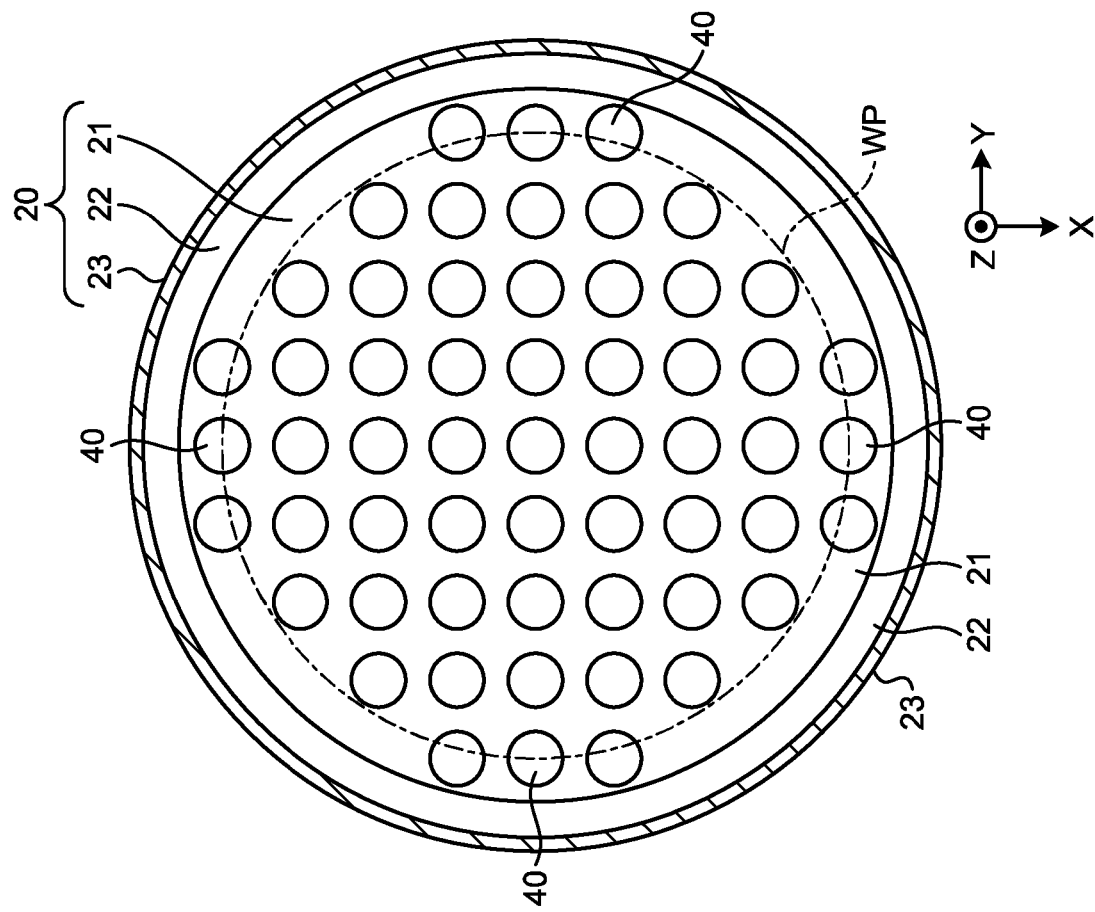

INSPECTION APPARATUS

CROSS-REFERENCE TO RELATED APPLICATIONS

This application is based upon and claims the benefit of priority from Japanese Patent Application No. 2019-163968, filed on Sep. 9, 2019; the entire contents of which are incorporated herein by reference.

FIELD

Embodiments described herein relate generally to an inspection apparatus.

BACKGROUND

An inspection apparatus using an ultrasonic wave can inspect an inspection object in a non-destructive manner by transmitting the ultrasonic wave to the inspection object and receiving the response therefrom. At this time, it is desirable to inspect the inspection object with high accuracy.

BRIEF DESCRIPTION OF THE DRAWINGS

FIG. 1 is a diagram illustrating an inspection object in an embodiment;

FIGS. 2A to 2D are diagrams illustrating the reaching time length from an ultrasonic oscillator to an ultrasonic collector;

FIGS. 4A and 4B are plan views illustrating configurations of stages, ultrasonic oscillators, and ultrasonic collectors in the embodiment;

DETAILED DESCRIPTION

Figure 3:
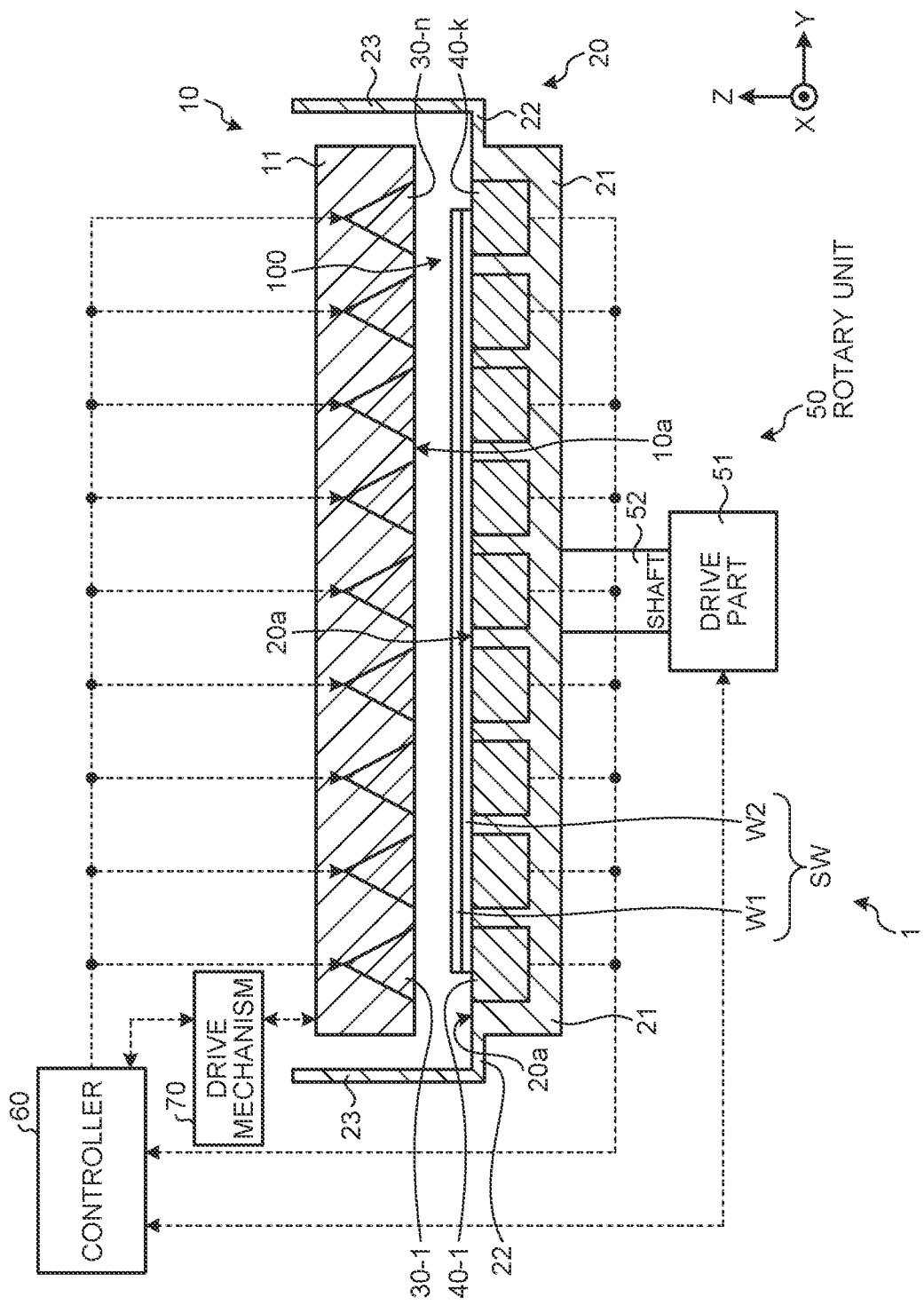
FIG. 3 is a sectional view illustrating a configuration of an inspection apparatus according to the embodiment.

In general, according to one embodiment, there is provided an inspection apparatus including a first stage, a second stage, an ultrasonic oscillator, and an ultrasonic collector. The first stage includes a first main face. The second stage includes a second main face opposed to the first main face. The ultrasonic oscillator is disposed in a first region. The first region includes the first main face. The first region further includes a region inside the first stage. The ultrasonic collector is disposed in a second region. The second region includes the second main face. The second region further includes a region inside the second stage.

Exemplary embodiments of an inspection apparatus will be explained below in detail with reference to the accompanying drawings. The present invention is not limited to the following embodiments.

Embodiment

An inspection apparatus according to an embodiment is an inspection apparatus using an ultrasonic wave, and can inspect an inspection object in a non-destructive manner by transmitting the ultrasonic wave to the inspection object and receiving the response therefrom. For example, the inspection object may be a laminated substrate composed of two substrates (two wafers) bonded to each other. In a laminated substrate, if there is a defect, such as a void (cavity), at the bonding interface, it could become difficult to realize a function required to the laminated substrate (for example, electrical connection between two electrodes). In this case, it is desired to inspect an inspection object about the presence or absence of a defect, such as a void (cavity), with high accuracy and in a non-destructive manner.

For this purpose, it is conceivable to perform an inspection about the presence or absence of a defect, such as a void (cavity), by transmitting an ultrasonic wave to the laminated substrate, receiving the ultrasonic wave reflected inside the laminated substrate, and analyzing the reception result. In this case, since a strong reflected wave tends to return if there is a defect, such as a void (cavity), it is possible to detect the presence or absence of the defect, such as a void (cavity), by displaying the difference of the intensity of the reflected wave with contrasting density and forming an image of this difference.

In order to improve the resolution of an inspection using reflection of an ultrasonic wave, it is conceivable to add an acoustic lens having a large diameter between the inspection object and the ultrasonic collector. In this case, the inspection apparatus needs to be upsized, such that the housing is made larger to accommodate the acoustic lens, and the ultrasonic oscillator and the ultrasonic collector are made larger to correspond to the acoustic lens. Thus, the cost of the inspection apparatus can be increased.

In consideration of the above, in the inspection apparatus according to the embodiment, an ultrasonic oscillator is arranged on one of two stages facing each other, and an ultrasonic collector is arranged on the other stage. With this arrangement, an inspection using the reaching time length of an ultrasonic wave is performed on an inspection object placed on one of the stages, and the accuracy of the non-destructive inspection can thereby be improved at a low cost.

Specifically, in a case where the inspection object for the inspection apparatus is a laminated substrate, an ultrasonic wave is applied from the outermost surface of the inspection object, and is checked about the reaching time length to a microphone arranged at the bottom side of the inspection object. It is generally known that the propagation speed of an ultrasonic wave is faster in a solid than in a gas. Accordingly, if the inspection object contains a defect, such as a void (cavity), it is expected that the reaching time length of the ultrasonic wave becomes longer than the target time length of a case where there is no defect.

For example, in a case where the inspection object for the inspection apparatus is a laminated substrate 100, the laminated substrate 100 may be configured as illustrated in FIG. 1. FIG. 1 is a diagram illustrating an inspection object, which illustrates the laminated structure of the laminated substrate 100 as the inspection object in a simplified state. FIG. 1 illustrates both of a structure containing no defect and a structure containing a defect (air or void). The laminated substrate 100 includes a front face 100*a* and a rear face 100*b*. Hereinafter, it is assumed that the direction perpendicular to the front face 100*a* of the laminated substrate 100 is a Z-direction and the two directions orthogonal to each other in the plane perpendicular to the Z-direction are an X-direction and a Y-direction.

The laminated substrate 100 is composed of a substrate W1 and a substrate W2 as substrates. In the substrate W1, an oxide film 102 is disposed on the −Z-side of a semiconductor substrate 101, and electrode pads 103-1 to 103-3 are exposed on a −Z-side surface 121 of the oxide film 102. In the substrate W2, an oxide film 112 is disposed on the +Z-side of a semiconductor substrate 111, and electrode pads 113-1 to 113-3 are exposed on a +Z-side surface 122 of the oxide film 112. In the laminated substrate 100, the substrate W1 and the substrate W2 are bonded to each other with the surfaces 121 and 122 of the oxide films 102 and 112 serving as bonding surfaces. Each of the semiconductor substrates 101 and 111 may be made of a material containing a semiconductor (such as silicon) as a main component. Each of the oxide films 102 and 112 may be made of a material containing a semiconductor oxide (such as silicon oxide) as a main component. Each of the electrode pads 103 and 113 may be made of a material containing a metal (such as copper) as a main component. There is a case where voids (cavities) 123-1 to 123-3 are present on the bonding surfaces 121 and 122.

Here, it is assumed that regions A and B extending in the Z-direction are cut out from the laminated substrate 100. Neither of the regions A and B passes through the electrode pads 103 and 113. The region A does not pass through any void 123, while the region B passes through a void. For this reason, as compared with the reaching time length of an ultrasonic wave to be detected at the region A, in the state illustrated in FIG. 2A where an ultrasonic oscillator 30 is arranged on the +Z-side and an ultrasonic collector 40 is arranged on the −Z-side, the reaching time length of the ultrasonic wave to be detected at the region B, in the state illustrated in FIG. 2B where the ultrasonic oscillator 30 is arranged on the +Z-side and the ultrasonic collector 40 is arranged on the −Z-side, tends to be longer.

Further, it is assumed that regions C and D extending in the Z-direction are cut out from the laminated substrate 100. Each of the regions C and D passes through one pair of the electrode pads 103 and 113. The region C does not pass through any void 123, while the region D passes through a void. For this reason, as compared with the reaching time length of an ultrasonic wave to be detected at the region C, in the state illustrated in FIG. 2C where the ultrasonic oscillator 30 is arranged on the +Z-side and the ultrasonic collector 40 is arranged on the −Z-side, the reaching time length of the ultrasonic wave to be detected at the region D, in the state illustrated in FIG. 2D where the ultrasonic oscillator 30 is arranged on the +Z-side and the ultrasonic collector 40 is arranged on the −Z-side, tends to be longer. The part surrounded by a dotted line in FIG. 2D indicates a defect to be specified by the inspection apparatus.

In this way, on the basis of the layout, composition, and so forth of the respective layers of the laminated substrate, the distribution of the target time length of a case where there is no defect is obtained in advance. Then, the difference is taken and mapped between the distribution of the reaching time length of an ultrasonic wave through the laminated substrate and the distribution of the target time length. Consequently, the position of a defect, such as a void (cavity) 123, in the inspection object can be specified.

More specifically, the inspection apparatus 1 may be configured as illustrated in FIG. 3. FIG. 3 is a view illustrating a configuration of the inspection apparatus 1.

The inspection apparatus 1 includes a stage 10, a stage 20, a plurality of ultrasonic oscillators 30-1 to 30-*n* ("n" is an integer of 2 or more), a plurality of ultrasonic collectors 40-1 to 40-*k* ("k" is an integer of 2 or more), a rotary unit 50, a drive mechanism 70, and a controller 60.

The stage 10 and the stage 20 may be set opposed to each other. The stage 10 includes a main face 10*a* on the side facing the stage 20, and the stage 20 includes a main face 20*a* on the side facing the stage 10. The main face 10*a* and the main face 20*a* are opposed to each other. Hereinafter, it is assumed that the direction perpendicular to the main face 20*a* of the stage 20 is the Z-direction and the two directions orthogonal to each other in the plane perpendicular to the Z-direction are the X-direction and the Y-direction.

The stage 10 is disposed on the +Z-side of the stage 20. The stage 10 includes a plate part 11. As illustrated in FIG. 4A, the plate part 11 has a substantially circular shape, when seen in the XY-plane. FIG. 4A is a plan view illustrating a configuration of the stage 10 and the ultrasonic oscillators 30-1 to 30-*n*.

The drive mechanism 70 is configured to drive the stage 10 at least in the Z-direction under the control of the controller 60. The drive mechanism 70 may be configured to drive the stage 10 further in the X-direction and the Y-direction under the control of the controller 60.

The plurality of ultrasonic oscillators 30-1 to 30-*n* are embedded in the main face 10*a* of the stage 10. The plurality of ultrasonic oscillators 30-1 to 30-*n* are disposed in a first region including the main face 10*a* inside the plate part 11 of the stage 10. The plurality of ultrasonic oscillators 30-1 to 30-*n* are arrayed in a planar state in the first region. As illustrated by dotted lines in FIG. 4A, the plurality of ultrasonic oscillators 30-1 to 30-*n* are arrayed along predetermined radial directions, when seen in the XY-plane. In the configuration illustrated as an example in FIG. 4A, the plurality of ultrasonic oscillators 30-1 to 30-*n* are arrayed along two radial directions substantially orthogonal to each other. Each ultrasonic oscillator 30 may also be referred to as "sound source unit".

The stage 20 is disposed on the −Z-side of the stage 10. The stage 20 may be configured to chuck the inspection object (laminated substrate 100). The stage 20 includes a plate part 21, a wall portion 22, and a wall portion 23. As illustrated in FIG. 4B, the plate part 21 has a substantially circular shape, when seen in the XY-plane. In FIG. 4B, a one-dot chain line indicates a region WP where the inspection object (laminated substrate 100) is to be placed. In a case where the stage 20 is configured to chuck the inspection object (laminated substrate 100), the plate part 21 may include a chucking mechanism. The chucking mechanism may be a mechanism for vacuum chucking, or may be a mechanism for electrostatic chucking.

The wall portion 22 has a thickness in the Z-direction smaller than that of the plate part 21, and is connected to the +Z-side end of the outer circumferential surface of the plate part 21. As illustrated in FIG. 4B, the wall portion 22 has a substantially ring shape surrounding the plate part 21, when seen in the XY-plane. The wall portion 23 rises up in the +Z-direction from the end of the wall portion 22 on the outer circumferential side. The wall portion 23 has a length in the Z-direction larger than the thickness of the plate part 21 in the Z-direction. As illustrated in FIG. 4B, the wall portion 23 has a substantially ring shape surrounding the wall portion 22, when seen in the XY-plane. With this arrangement, the space surrounded by the plate part 21, the wall portion 22, and the wall portion 23 can store a liquid, such as water, at the time of the inspection.

The plurality of ultrasonic collectors 40-1 to 40-$k$ are embedded in the main face 20$a$ of the stage 20. The plurality of ultrasonic collectors 40-1 to 40-$k$ are disposed in a second region including the main face 20$a$ inside the plate part 21 of the stage 20. The plurality of ultrasonic collectors 40-1 to 40-$k$ are arrayed in a planar state in the second region. As illustrated in FIG. 4B, the plurality of ultrasonic collectors 40-1 to 40-$k$ are arrayed along a plurality of predetermined directions, when seen in the XY-plane. In the configuration illustrated as an example in FIG. 4B, the plurality of ultrasonic collectors 40-1 to 40-$k$ are arrayed along the X-direction and the Y-direction. Each ultrasonic collector 40 may also be referred to as "microphone".

The rotary unit 50 illustrated in FIG. 3 is configured to rotate one of the stage 10 and the stage 20 relative to the other stage. In the configuration illustrated as an example in FIG. 3, the stage 20 is rotated. The rotary unit 50 includes a drive part 51 and a shaft 52. The drive part 51 includes a rotary motor, for example, and is configured to rotate the shaft 52 in a rotational direction about a Z-axis by using the rotary motor. The shaft 52 is connected to the −Z-side end of the central portion of the plate part 21. Thus, the drive part 51 can rotate the plate part 21 through the shaft 52 in the rotational direction about the Z-axis.

At this time, as illustrated in FIGS. 4A and 4B, the ultrasonic oscillators 30 arrayed along predetermined radial directions can pass at a high speed by the +Z-side of the ultrasonic collectors 40 arrayed in a two-dimensional state. Consequently, the inspection apparatus 1 can be configured to perform an inspection about the reaching time length of an ultrasonic wave at a high speed by using a smaller number of ultrasonic oscillators 30.

Figure 5:
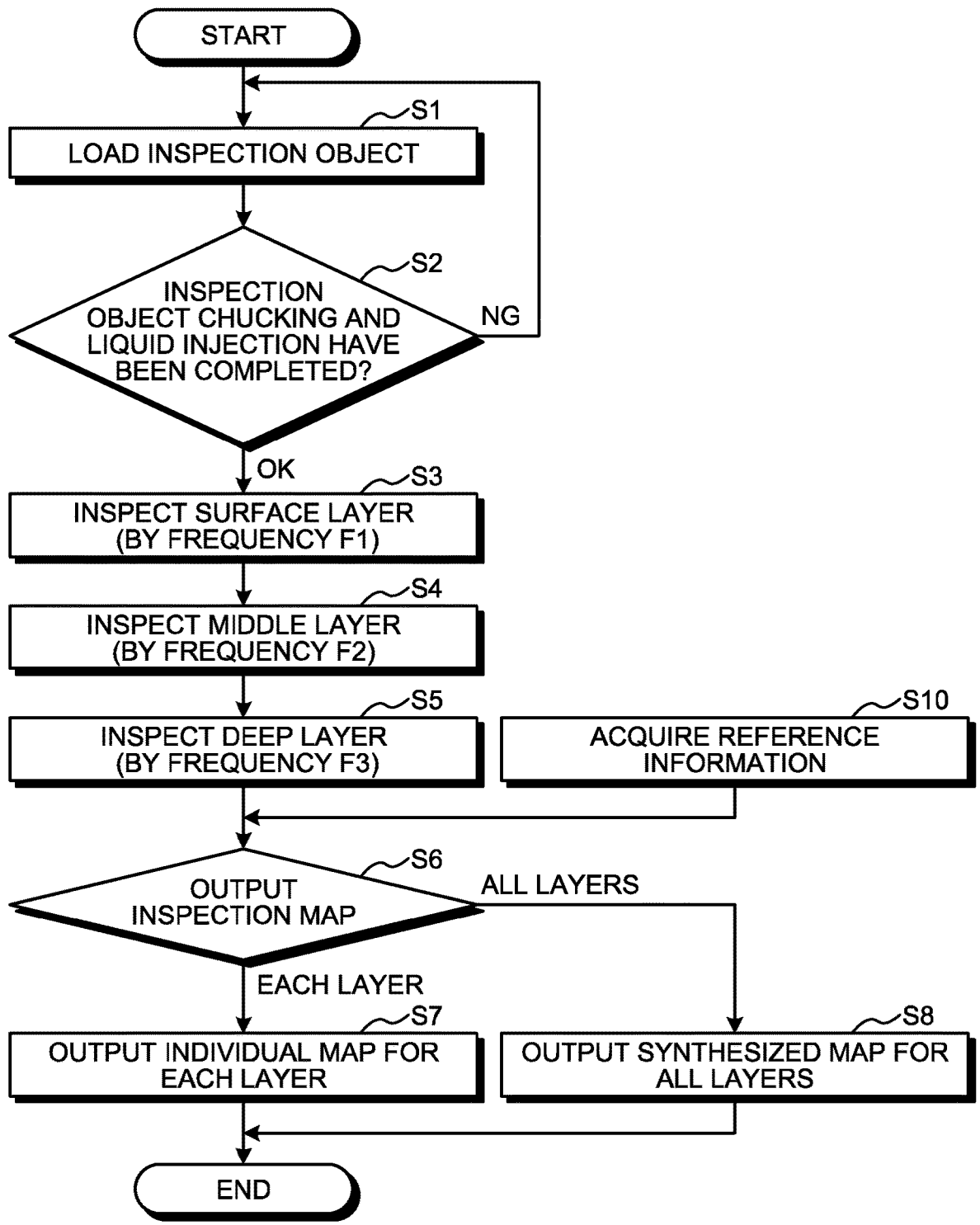
FIG. 5 is a flowchart illustrating an operation of the inspection apparatus according to the embodiment.

The controller 60 illustrated in FIG. 3 is configured to perform overall control on the respective parts of the inspection apparatus 1. For example, the controller 60 controls an operation of the inspection apparatus 1 as illustrated in FIG. 5. FIG. 5 is a flowchart illustrating an operation of the inspection apparatus 1.

Figure 6A:
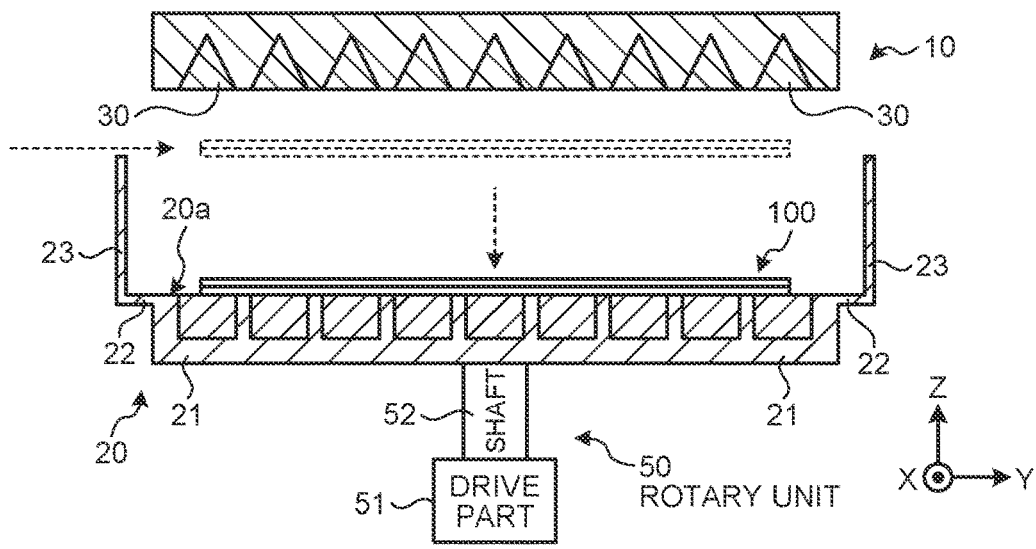
FIGS. 6A to 6C are diagrams illustrating an operation of the inspection apparatus according to the embodiment.

In the inspection apparatus 1, as illustrated in FIG. 6A, the controller 60 operates to place (load) the inspection object (laminated substrate 100) onto the main face 20$a$ of the stage 20 (S1). After the loading, the controller 60 may operate to chuck the inspection object by the chucking mechanism of the plate part 21. This is to eliminate, as much as possible, shape factors that affect the inspection, such as warping and distortion of the inspection object.

When a chucking error occurs and chucking of the inspection object has not been completed (NG at S2), the controller 60 operates to load the inspection object onto the main surface 20$a$ of the stage 20 (S1) again, and to chuck the inspection object again.

Figure 6B:
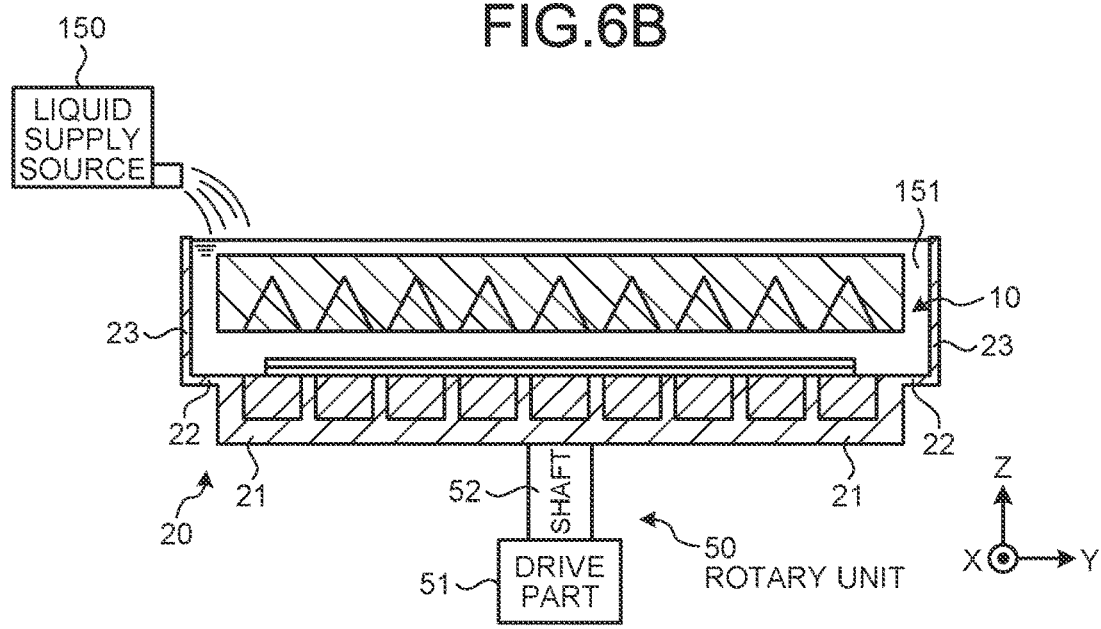

When the chucking has succeeded, then following the chucking of the inspection object, the controller 60 operates, as illustrated in FIG. 6B, to inject a liquid 151, such as pure water or a solvent equivalent thereto, from a liquid supply source 150 into the space surrounded by the plate part 21, the wall portion 22, and the wall portion 23. This is to make it easier for an ultrasonic wave emitted from the ultrasonic oscillators 30 arranged on the stage 10 to reach the inspection object (laminated substrate 100).

Figure 6C:
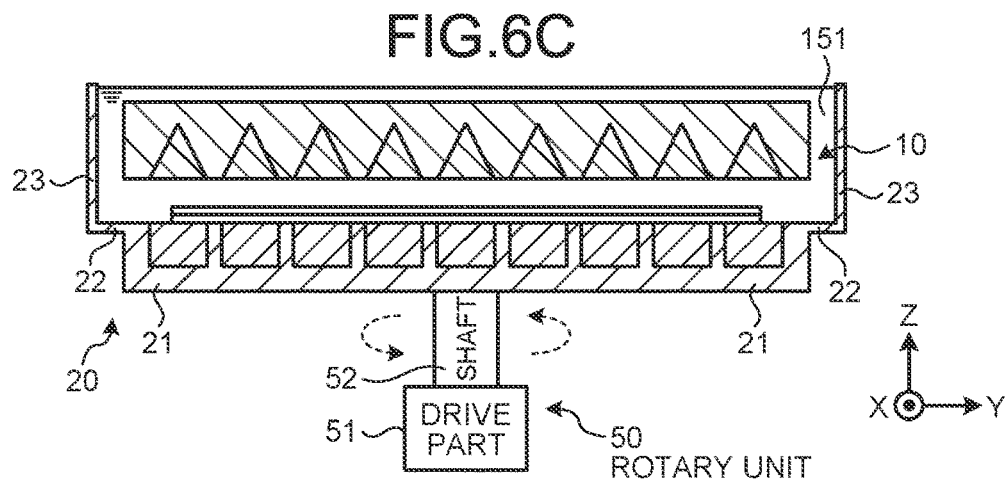

The controller 60 uses a predetermined sensor (not illustrated) to detect the liquid surface of the liquid 151, or uses another method, so as to recognize completion of the injection of the liquid into the space surrounded by the plate part 21, the wall portion 22, and the wall portion 23. When recognizing that the injection of the liquid has been completed (OK at S2), the controller 60 controls the rotary unit 50, as illustrated in FIG. 6C, to rotate the stage 20 in the rotational direction about the Z-axis. At this time, as the stage 10 is not rotated, it is satisfied to rotate one of the stage 10 and the stage 20 relative to the other stage. In this state, the controller 60 performs control to transmit an ultrasonic wave from the ultrasonic oscillators 30, and to acquire signals indicating the intensity of the ultrasonic wave received by the ultrasonic collectors 40.

At this time, the ultrasonic oscillators 30 arrayed along predetermined radial directions can pass at a high speed by the +Z-side of the ultrasonic collectors 40 arrayed in a two-dimensional state (see FIG. 4B). By using rotation of the stage, the reaching time length of an ultrasonic wave is mapped. Here, the depth at which an ultrasonic wave easily penetrates into a substance varies depending on the frequency of the ultrasonic wave. Accordingly, as illustrated in the operation flow of FIG. 5, a plurality of different frequencies F1 to F3 are provided as ultrasonic waves, and the inspection is continuously performed by using each of the frequencies F1 to F3.

For example, when F1>F2>F3 stands, the frequency F1 can be used to inspect a surface layer in the laminated substrate 100, the frequency F2 can be used to inspect a middle layer in the laminated substrate 100, and the frequency F3 can be used to inspect a deep layer in the laminated substrate 100. Here, it may be set that the frequency F1=100 MHz to 300 MHz, the frequency F2=10 MHz to 100 MHz, and the frequency F3=20 KHz to 10 MHz.

The controller 60 operates to inspect the surface layer in the laminated substrate 100 (S3) by transmitting an ultrasonic wave of the frequency F1 from the ultrasonic oscillators 30 toward the inspection object (laminated substrate 100), and acquiring signals indicating the intensity of the ultrasonic wave received by the ultrasonic collectors 40. In the controller 60, the respective XY-positions of the ultrasonic collectors 40 are set in advance. On the basis of the intensity of the ultrasonic wave received by the ultrasonic collectors 40 and the XY-positions of the ultrasonic collectors 40, the controller 60 specifies the reaching time length of the ultrasonic wave for each of the XY-positions. The controller 60 performs mapping on the reaching time length of the ultrasonic wave thus specified for each of the XY-positions. The controller 60 holds the mapping result as mapping information of the detection result for the surface layer.

The controller 60 operates to inspect the middle layer in the laminated substrate 100 (S4) by transmitting an ultrasonic wave of the frequency F2 from the ultrasonic oscillators 30 toward the inspection object (laminated substrate 100), and acquiring signals indicating the intensity of the ultrasonic wave received by the ultrasonic collectors 40. On the basis of the intensity of the ultrasonic wave received by the ultrasonic collectors 40 and the XY-positions of the ultrasonic collectors 40, the controller 60 specifies the reaching time length of the ultrasonic wave for each of the XY-positions. The controller 60 performs mapping on the reaching time length of the ultrasonic wave thus specified for each of the XY-positions. The controller 60 holds the mapping result as mapping information of the detection result for the middle layer.

The controller 60 operates to inspect the deep layer in the laminated substrate 100 (S5) by transmitting an ultrasonic wave of the frequency F3 from the ultrasonic oscillators 30 toward the inspection object (laminated substrate 100), and acquiring signals indicating the intensity of the ultrasonic wave received by the ultrasonic collectors 40. On the basis of the intensity of the ultrasonic wave received by the ultrasonic collectors 40 and the XY-positions of the ultrasonic collectors 40, the controller 60 specifies the reaching time length of the ultrasonic wave for each of the XY-positions. The controller 60 performs mapping on the reaching time length of the ultrasonic wave thus specified for each of the XY-positions. The controller 60 holds the mapping result as mapping information of the detection result for the deep layer.

Further, by the time of completion of S5, the controller 60 acquires mapping information on the target time length as reference information (S10). With reference to the process design information on the substrate W1 and the substrate W2, the controller 60 can obtain the distribution of the target time length of a case where there is no defect, on the basis of the layout, composition, and so forth of the respective layers included in the laminated substrate 100, and set the distribution of the target time length as the mapping information on the target time length. The mapping information on the target time length may be acquired for each of the plurality of different frequencies F1 to F3. The controller 60 may acquire, as reference information, the mapping information on the target time length for the surface layer that corresponds to the frequency F1, the mapping information on the target time length for the middle layer that corresponds to the frequency F2, and the mapping information on the target time length for the deep layer that corresponds to the frequency F3.

Upon completion of S5, the controller 60 determines how to output an inspection map. When the inspection map should be output for each of the layers ("EACH LAYER" at S6), the controller 60 creates individual mapping information for each layer, and outputs the information (S7).

Figure 7A:
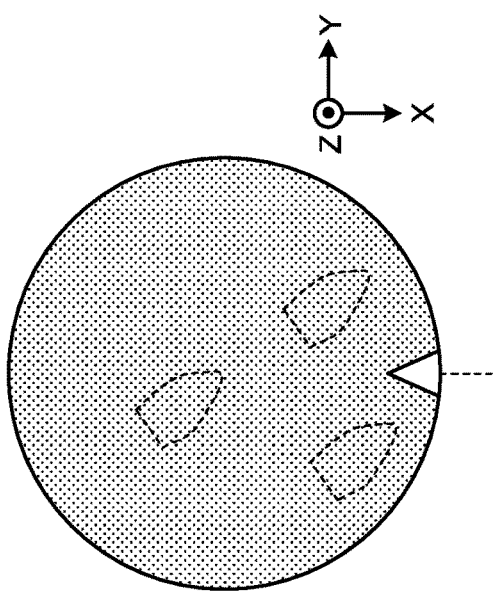
FIGS. 7A to 7D are diagrams illustrating mapping information in the embodiment.

For example, the controller 60 takes the difference between the mapping information of the detection result for the surface layer held in S3 and the mapping information on the target time length for the surface layer acquired in S10. Further, the controller 60 obtains an inspection map for the surface layer (mapping information on the surface layer) as illustrated in FIG. 7A, and outputs the inspection map onto a display screen (not illustrated) or the like of the inspection apparatus 1. FIG. 7A is a diagram illustrating the mapping information on the surface layer. As illustrated by a dotted line in FIG. 7A, the mapping information on the surface layer indicates the XY-position of a defect, such as a void, in the surface layer.

Figure 7B:
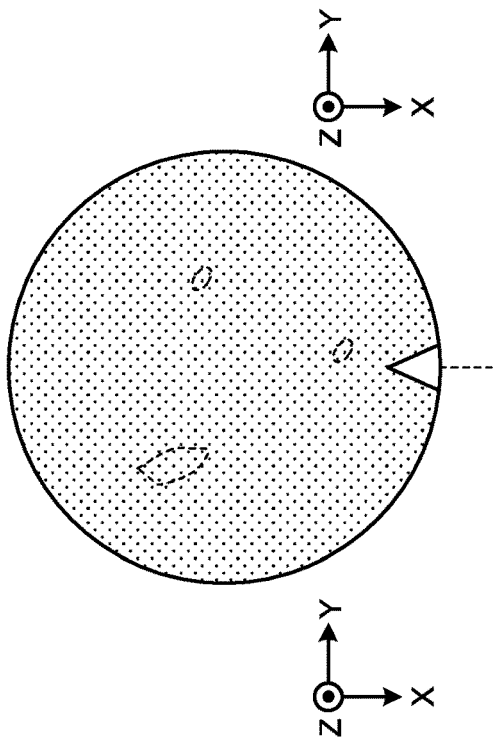

The controller 60 takes the difference between the mapping information of the detection result for the middle layer held in S3 and the mapping information on the target time length for the middle layer acquired in S10. Further, the controller 60 obtains an inspection map for the middle layer (mapping information on the middle layer) as illustrated in FIG. 7B, and outputs the inspection map onto the display screen (not illustrated) or the like of the inspection apparatus 1. FIG. 7B is a diagram illustrating the mapping information on the middle layer. As illustrated by a dotted line in FIG. 7B, the mapping information on the middle layer indicates the XY-position of each defect, such as a void, in the middle layer.

Figure 7C:
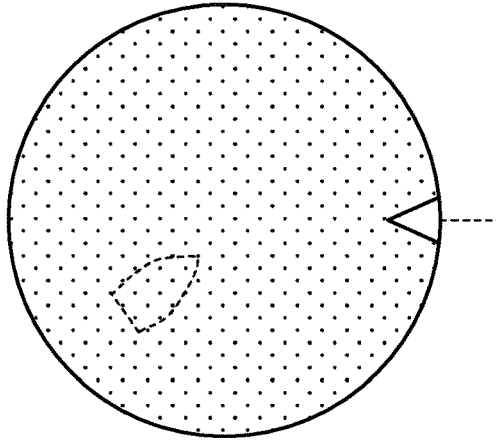

The controller 60 takes the difference between the mapping information of the detection result for the deep layer held in S3 and the mapping information on the target time length for the deep layer acquired in S10. Further, the controller 60 obtains an inspection map for the deep layer (mapping information on the deep layer) as illustrated in FIG. 7C, and outputs the inspection map onto the display screen (not illustrated) or the like of the inspection apparatus 1. FIG. 7C is a diagram illustrating the mapping information on the deep layer. As illustrated by a dotted line in FIG. 7C, the mapping information on the deep layer indicates the XY-position of each defect, such as a void, in the deep layer.

When the inspection map should be synthesized and output for all the layers ("ALL LAYERS" at S6), the controller 60 synthesizes pieces of the mapping information for the respective layers into one piece of mapping information, and outputs this information as mapping information on all the layers (S8).

Figure 7D:
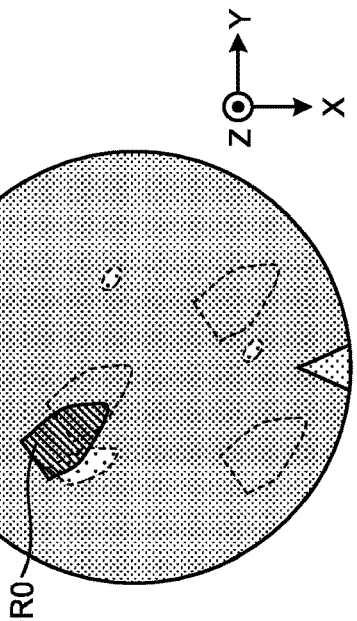

For example, as in S7, the controller 60 obtains the mapping information on the surface layer illustrated in FIG. 7A, the mapping information on the middle layer illustrated in FIG. 7B, and the mapping information on the deep layer illustrated in FIG. 7C. Further, for example, for each of the XY-positions, the controller 60 multiplies the mapping information on the surface layer illustrated in FIG. 7A, the mapping information on the middle layer illustrated in FIG. 7B, and the mapping information on the deep layer illustrated in FIG. 7C by respective predetermined weighting coefficients, and adds up these products to obtain the mapping information on all the layers as illustrated in FIG. 7D. In FIG. 7D, the magnitude of the difference of the reaching time length from the target time length is expressed with contrasting density, and the XY-position of each defect, such as a void, is indicated by the dark shade portion DR0.

Figure 8:
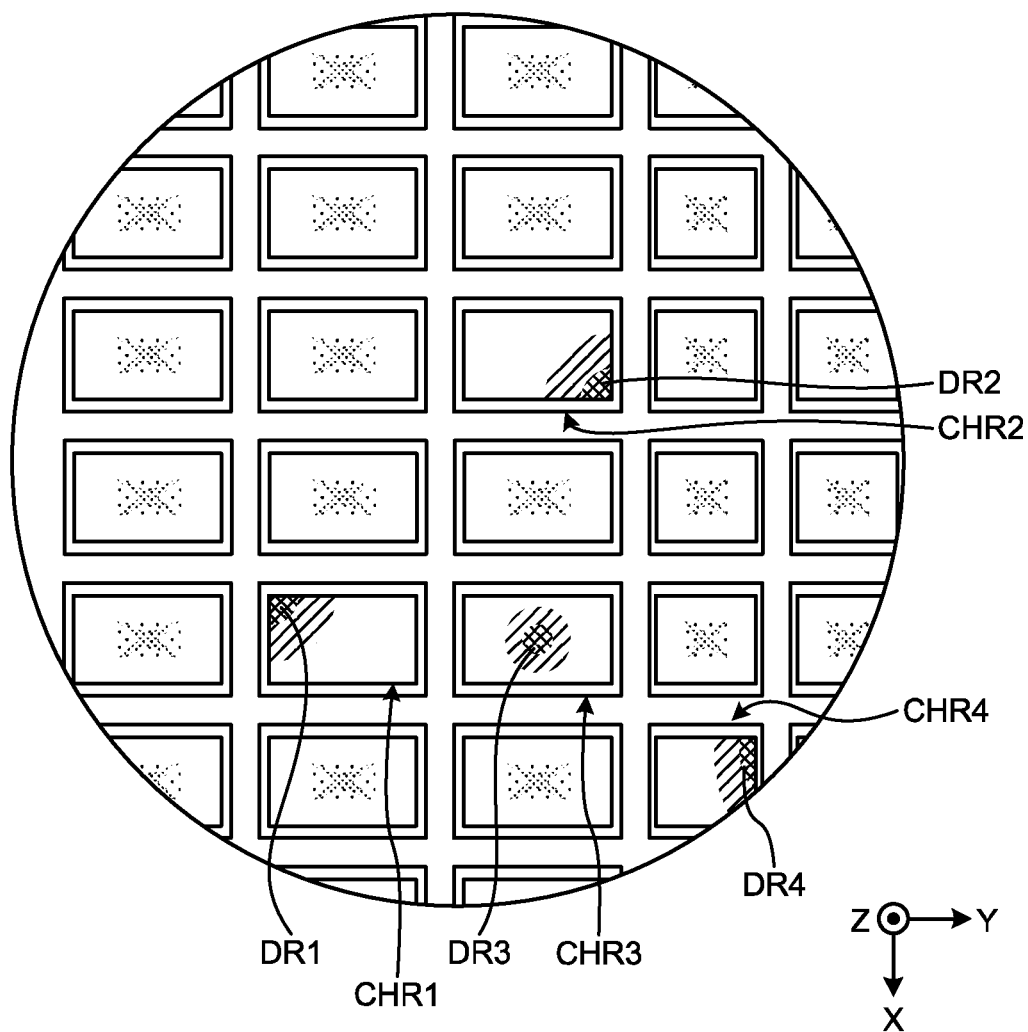
FIG. 8 is a diagram illustrating mapping information in the embodiment.

Here, as illustrated in FIG. 8, the controller 60 may further superimpose and synthesize the XY-positions of a plurality of chip areas to be singulated onto the mapping information on all the layers, to create mapping information. FIG. 8 illustrates the mapping information on all the layers that contains information on chip areas. With reference to these mapped areas, it can be seen that chip areas CHR1 to CHR4 including dark shade portions DR1 to DR4 are unusable chip areas. Consequently, it is possible to determine whether chips are usable or not, in unit of a chip to be singulated.

As described above, in the inspection apparatus 1 according to this embodiment, the ultrasonic oscillators 30 are disposed on one of the two stages 10 and 20 opposed to each other, and the ultrasonic collectors 40 are disposed on the other stage, to perform an inspection using the reaching time length of an ultrasonic wave, on an inspection object placed on the stage 20. Consequently, it is possible to downsize each defect position inspection element itself, and thereby to expect an improvement in the number of inspection elements that can be mounted in a single inspection apparatus and an improvement in throughput. As a result, it can be realized to improve the accuracy of the non-destructive inspection on an inspection object at a low cost.

Here, in place of the reaching time length of an ultrasonic wave, the inspection apparatus 1 may perform an inspection using the reaching average speed of the ultrasonic wave, on an inspection object. In this case, for each of the XY-positions, the inspection apparatus 1 multiplies the reciprocal of the reaching time length of the ultrasonic wave by the thickness of the laminated substrate 100 in the Z-direction, to obtain the reaching average speed of the ultrasonic wave. Then, the inspection can be performed as in the embodiment described above.

Further, in S3 to S8 of FIG. 5, there may be a case where the measurement time becomes too long depending on the data size of the mapping information. Accordingly, the inspection apparatus 1 may create mapping information that is reasonably thinned out.

Figure 9B:
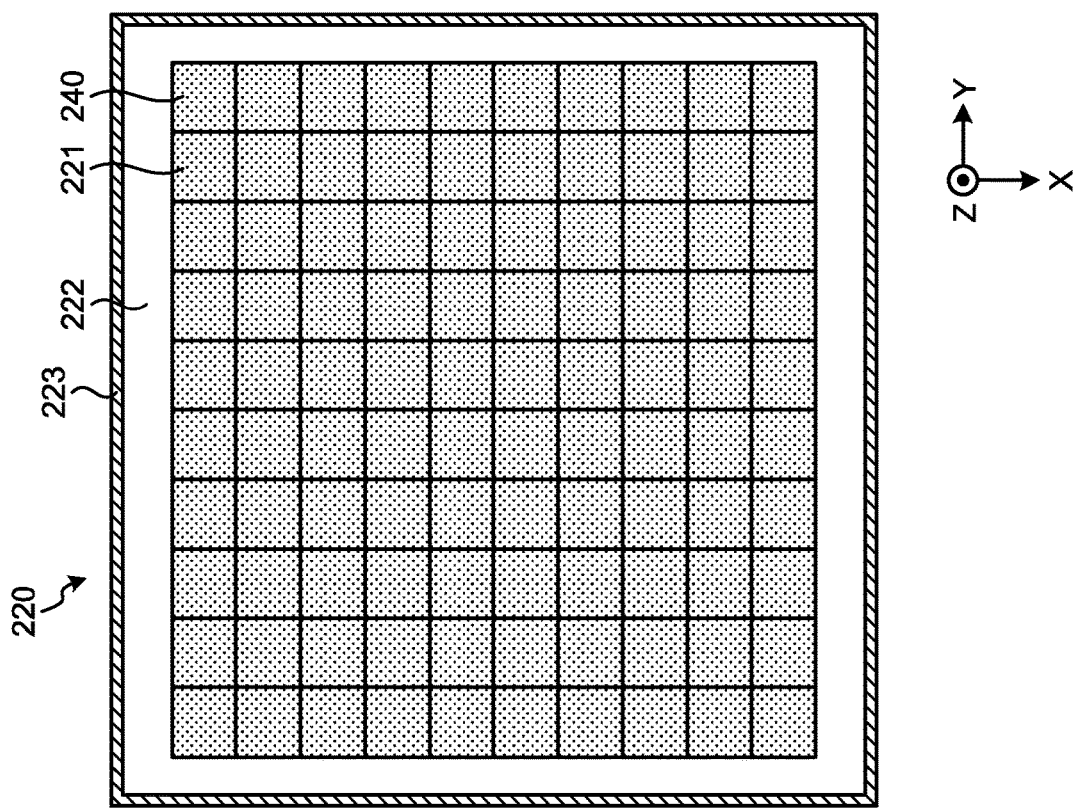
FIGS. 9A and 9B are plan views illustrating configurations of stages, ultrasonic oscillators, and ultrasonic collectors in a first modification of the embodiment.
Figure 9A:
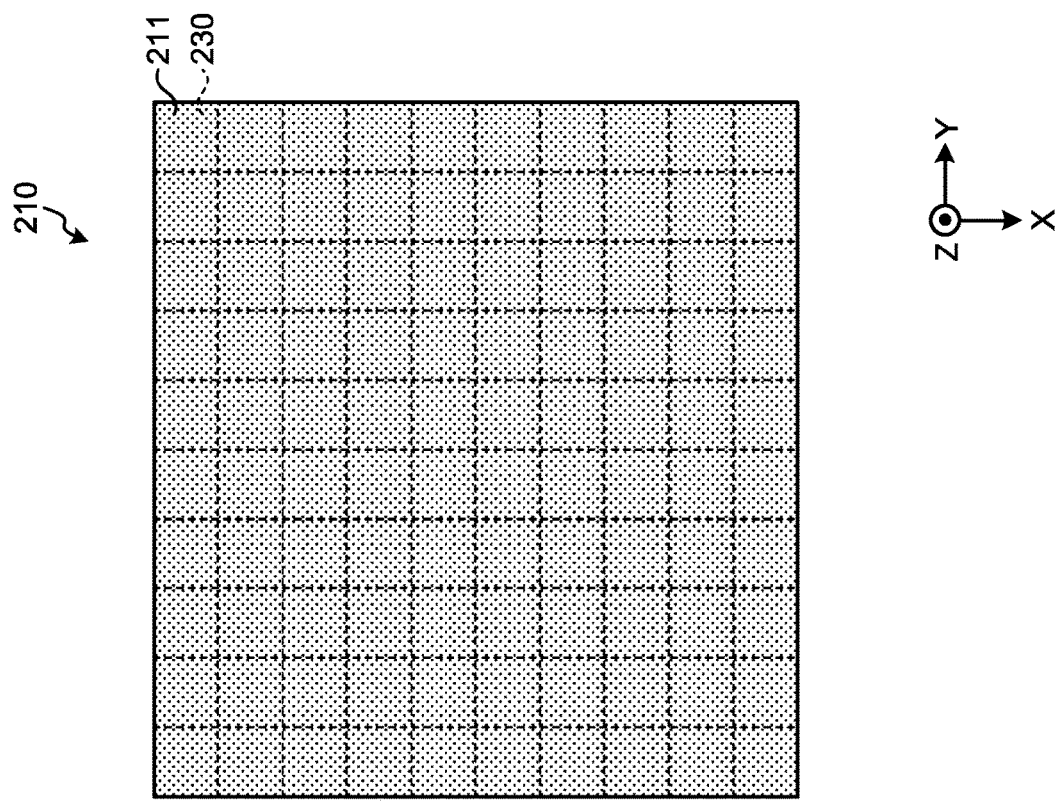

As an alternative configuration, the inspection apparatus 1 may be configured by omitting the rotary unit 50 (see FIG. 1). In this case, as illustrated in FIGS. 9A and 9B, the inspection apparatus 1 may be configured such that stages 210 and 220 are formed of flat plates each having a substantially rectangular shape, in which a plurality of ultrasonic oscillators 230 and a plurality of ultrasonic collectors 240 are provided in the same number to correspond to each other on a one-by-one basis. Each set of the ultrasonic oscillators 230 and the ultrasonic collectors 240 may be arranged in a grid pattern. FIGS. 9A and 9B are plan views illustrating configurations of the stages 210 and 220, the ultrasonic oscillators 230, and the ultrasonic collectors 240 in a first modification of the embodiment For example, each of the stages 210 and 220 may be set with a square size that can correspond to a wafer of 300 mm, when seen in the XY-plane. The grid cell size of the ultrasonic oscillators 230 and the ultrasonic collectors 240 may be set to "3 mm×3 mm" at the maximum. In this respect, in order to improve the resolution, the ultrasonic oscillators 230 and the ultrasonic collectors 240 may be formed with a grid cell size smaller than the square of 3 mm and thereby arranged in a larger number.

As illustrated in FIG. 9B, a plate part 221 has a substantially rectangular shape, when seen in the XY-plane. A wall portion 222 has a substantially rectangular shape surrounding the plate part 221, when seen in the XY-plane. A wall portion 223 has a substantially rectangular shape surrounding the wall portion 222, when seen in the XY-plane.

As illustrated in FIG. 9A, the plurality of ultrasonic oscillators 230 are embedded in the −Z-side main face of the stage 210, and are arrayed along the X-direction and the Y-direction. In FIG. 9A, the ultrasonic oscillators 230 are disposed at portions shown with hatching. The plurality of ultrasonic oscillators 230 may be arrayed to fill the −Z-side main face of the stage 210, when seen in the XY-plane. As illustrated in FIG. 9B, the plurality of ultrasonic collectors 240 are embedded in the +Z-side main face of the stage 220, and are arrayed along the X-direction and the Y-direction. In FIG. 9B, the ultrasonic collectors 240 are disposed at portions shown with hatching. The plurality of ultrasonic collectors 240 may be arrayed to fill the +Z-side main face of the stage 220, when seen in the XY-plane.

Figure 10A:
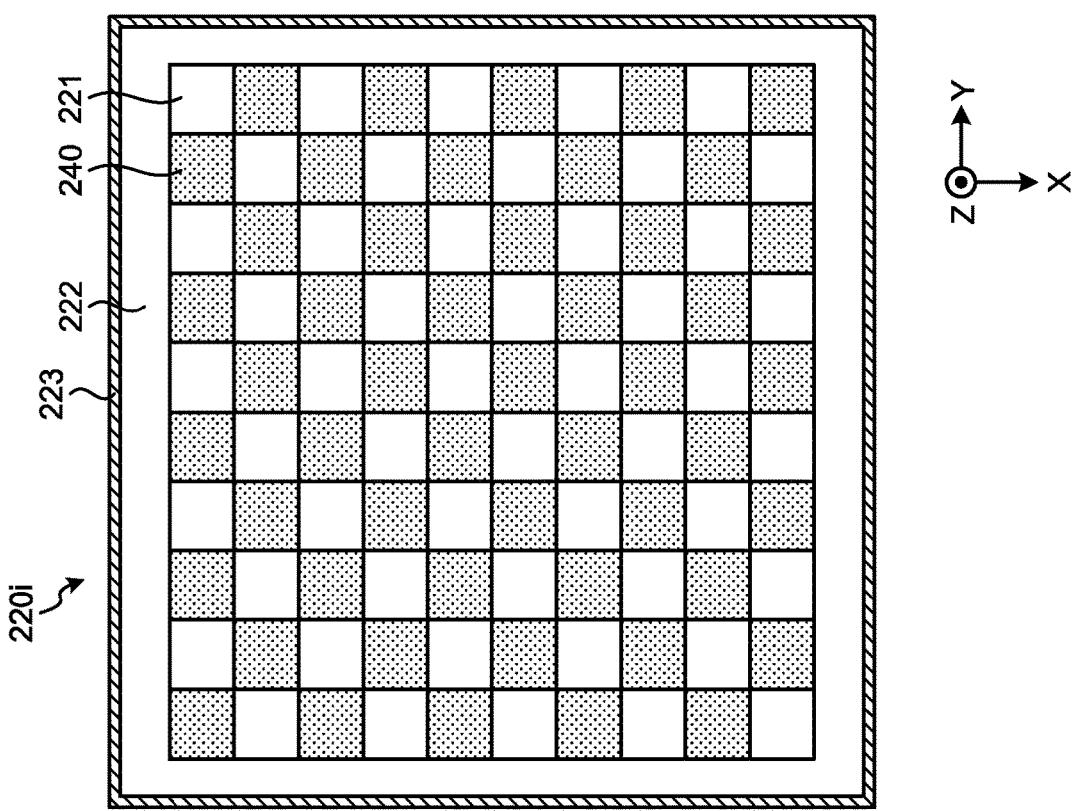
FIGS. 10A and 10B are plan views illustrating configurations of stages, ultrasonic oscillators, and ultrasonic collectors in a second modification of the embodiment.
Figure 10B:
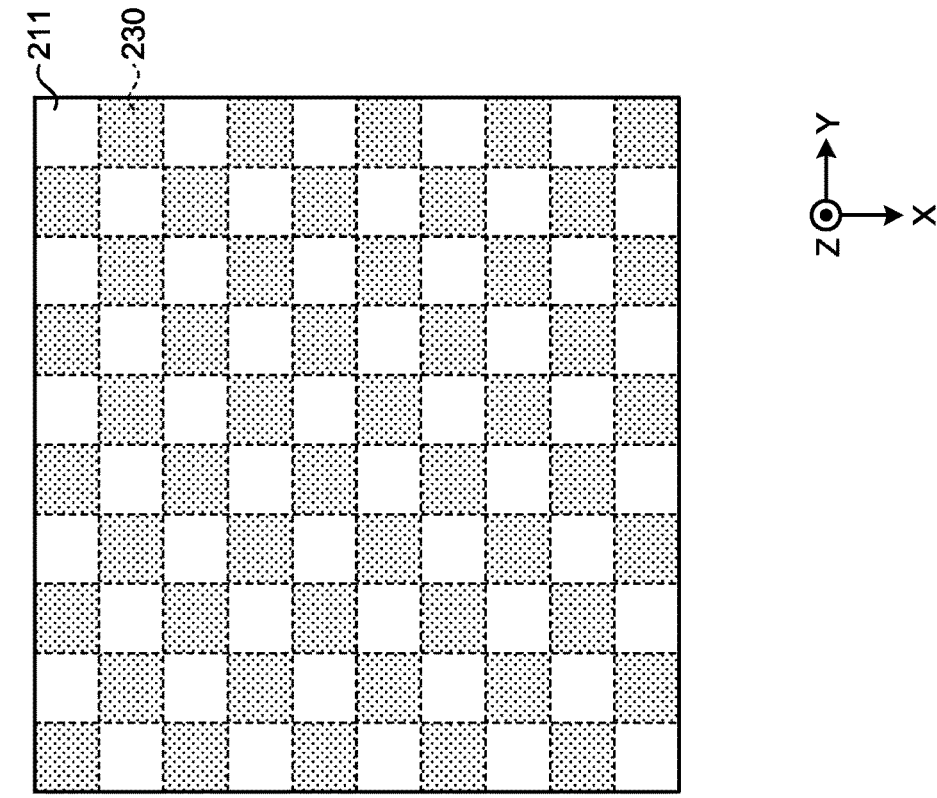

Alternatively, as illustrated in FIGS. 10A and 10B, the inspection apparatus 1 may be configured such that stages 210i and 220i are formed of flat plates each having a substantially rectangular shape, in which a plurality of ultrasonic oscillators 230 and a plurality of ultrasonic collectors 240 are provided in the same number to correspond to each other on a one-by-one basis. FIGS. 10A and 10B are plan views illustrating configurations of the stages 210i and 220i, the ultrasonic oscillators 230, and the ultrasonic collectors 240 in a second modification of the embodiment. As illustrated in FIG. 10A, the plurality of ultrasonic oscillators 230 are embedded in the −Z-side main face of the stage 210i, and are arrayed along the X-direction and the Y-direction. In FIG. 10A, the ultrasonic oscillators 230 are disposed at portions shown with hatching. The plurality of ultrasonic oscillators 230 may be arrayed in a check pattern on the −Z-side main face of the stage 210i, when seen in the XY-plane. As illustrated in FIG. 10B, the plurality of ultrasonic collectors 240 are embedded in the +Z-side main face of the stage 220i, and are arrayed along the X-direction and the Y-direction. In FIG. 10B, the ultrasonic collectors 240 are disposed at portions shown with hatching. The plurality of ultrasonic collectors 240 may be arrayed in a check pattern on the +Z-side main face of the stage 220i, when seen in the XY-plane.

Figure 11B:
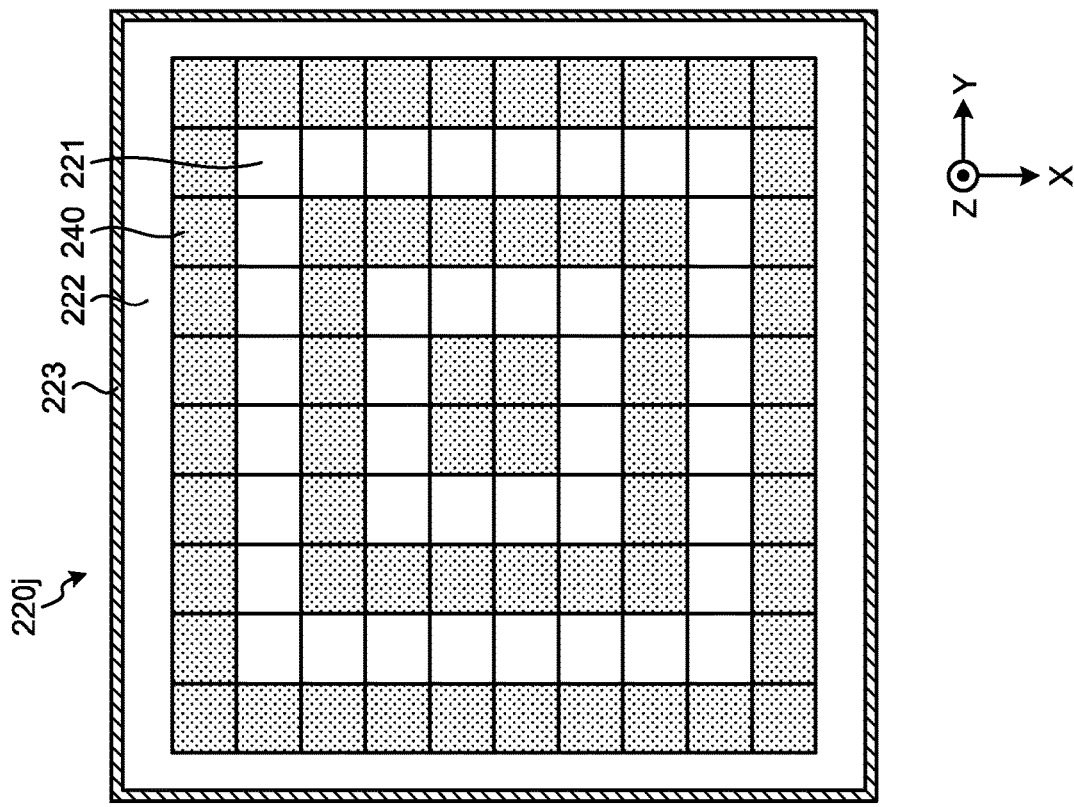
FIGS. 11A and 11B are plan views illustrating configurations of stages, ultrasonic oscillators, and ultrasonic collectors in a third modification of the embodiment.
Figure 11A:
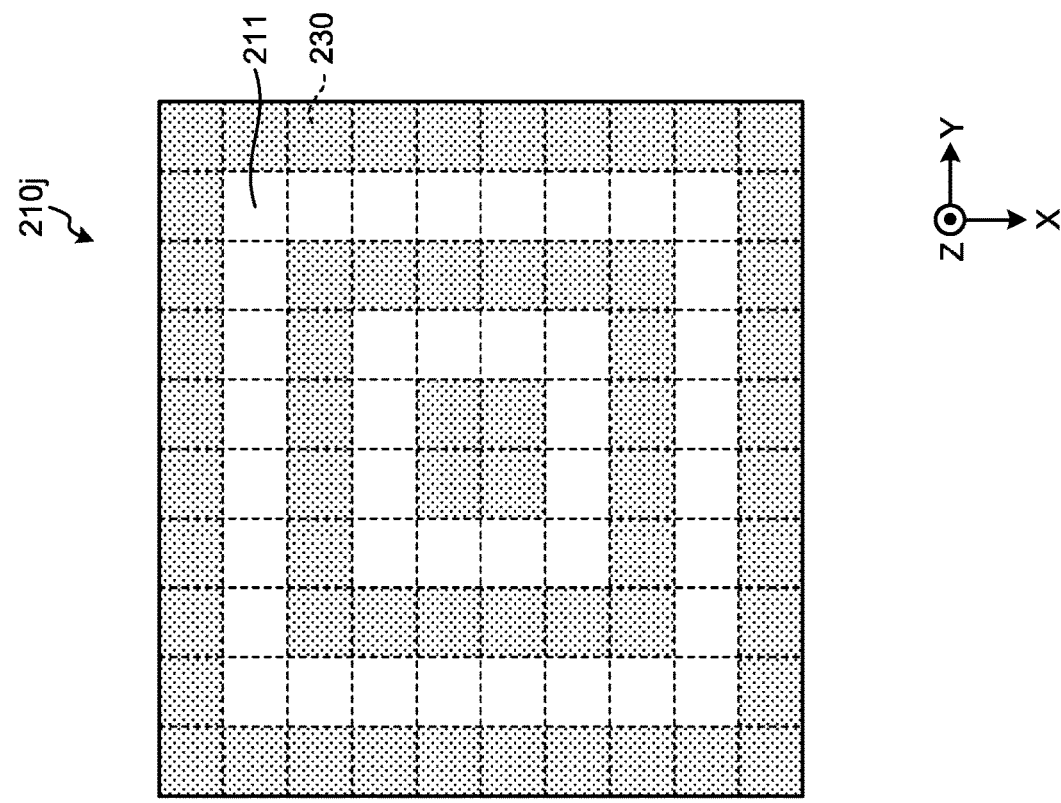

Alternatively, as illustrated in FIGS. 11A and 11B, the inspection apparatus 1 may be configured such that stages 210j and 220j are formed of flat plates each having a substantially rectangular shape, in which a plurality of ultrasonic oscillators 230 and a plurality of ultrasonic collectors 240 are provided in the same number to correspond to each other on a one-by-one basis. FIGS. 11A and 11B are plan views illustrating configurations of the stages 210j and 220j, the ultrasonic oscillators 230, and the ultrasonic collectors 240 in a third modification of the embodiment. As illustrated in FIG. 11A, the plurality of ultrasonic oscillators 230 are embedded in the −Z-side main face of the stage 210j, and are arrayed along the X-direction and the Y-direction. In FIG. 11A, the ultrasonic oscillators 230 are disposed at portions shown with hatching. The plurality of ultrasonic oscillators 230 may be arrayed in a concentric pattern on the −Z-side main face of the stage 210j, when seen in the XY-plane. As illustrated in FIG. 11B, the plurality of ultrasonic collectors 240 are embedded in the +Z-side main face of the stage 220j, and are arrayed along the X-direction and the Y-direction. In FIG. 11B, the ultrasonic collectors 240 are disposed at portions shown with hatching. The plurality of ultrasonic collectors 240 may be arrayed in a concentric pattern on the +Z-side main face of the stage 220j, when seen in the XY-plane.

Figure 12B:
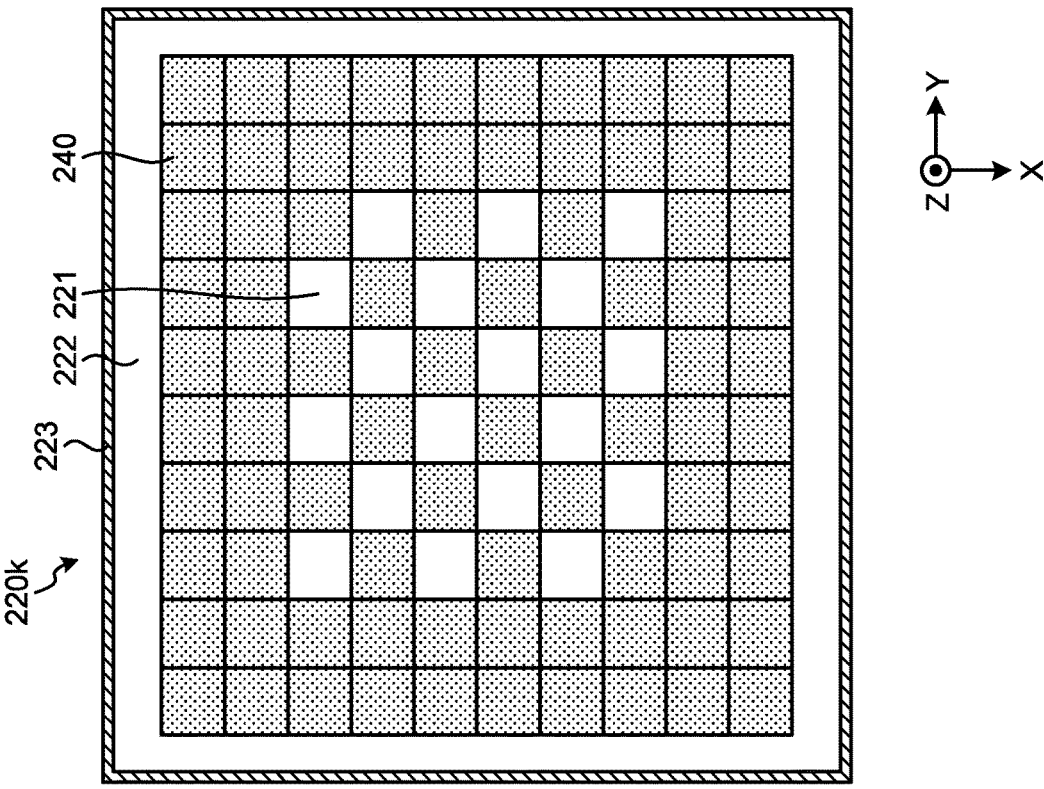
FIGS. 12A and 12B are plan views illustrating configurations of stages, ultrasonic oscillators, and ultrasonic collectors in a fourth modification of the embodiment.
Figure 12A:
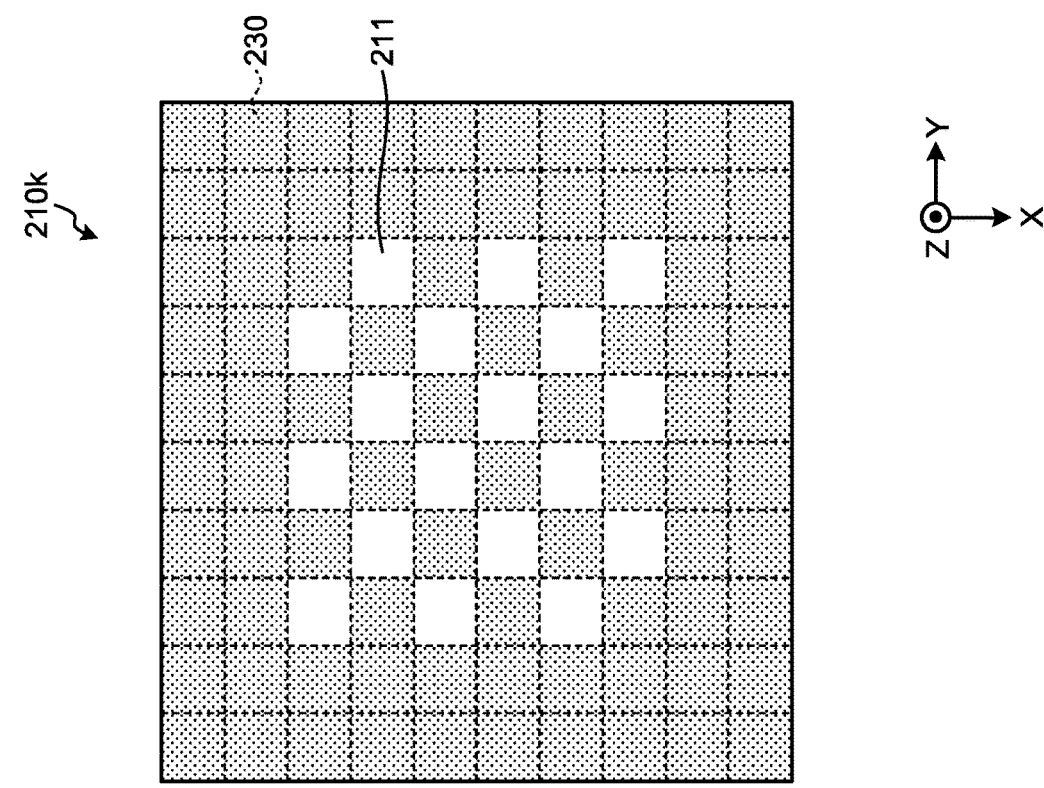

Alternatively, as illustrated in FIGS. 12A and 12B, the inspection apparatus 1 may be configured such that stages 210k and 220k are formed of flat plates each having a substantially rectangular shape, in which a plurality of ultrasonic oscillators 230 and a plurality of ultrasonic collectors 240 are provided in the same number to correspond to each other on a one-by-one basis. FIGS. 12A and 12B are plan views illustrating configurations of the stages 210k and 220k, the ultrasonic oscillators 230, and the ultrasonic collectors 240 in a fourth modification of the embodiment. As illustrated in FIG. 12A, the plurality of ultrasonic oscillators 230 are embedded in the −Z-side main face of the stage 210k, and are arrayed along the X-direction and the Y-direction. In FIG. 12A, the ultrasonic oscillators 230 are disposed at portions shown with hatching. The plurality of ultrasonic oscillators 230 may be arrayed to fill an outer region and to be in a check pattern on an inner region (region of "6×6" cells on the central side), on the −Z-side main face of the stage 210k, when seen in the XY-plane. As illustrated in FIG. 12B, the plurality of ultrasonic collectors 240 are embedded in the +Z-side main face of the stage 220k, and are arrayed along the X-direction and the Y-direction. In FIG. 12B, the ultrasonic collectors 240 are disposed at portions shown with hatching. The plurality of ultrasonic collectors 240 may be arrayed to fill an outer region and to be in a check pattern on an inner region (region of "6×6" cells on the central side), on the +Z-side main face of the stage 220k, when seen in the XY-plane.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection apparatus comprising:
a first stage including a first main face;
a second stage including a second main face opposed to the first main face;
an ultrasonic oscillator disposed in first region, the first region including the first main face, the first region further including a region inside the first stage, the first region being provided with a plurality of ultrasonic oscillators;
an ultrasonic collector disposed in a second region, the second region including the second main face, the second region further including a region inside the second stage, the second region being provided with a plurality of ultrasonic collectors; and
a rotary unit configured to rotate one of the first stage and the second stage relative to the other stage.

2. The inspection apparatus according to claim 1, wherein
the first stage has a circular shape, when seen in a plane, and
the second stage has a circular shape, when seen in the plane.

3. The inspection apparatus according to claim 2, wherein
the first region is provided with the plurality of ultrasonic oscillators disposed along a radial direction of the first stage, and
the second region is provided with the plurality of ultrasonic collectors disposed in a planar state.

4. The inspection apparatus according to claim 2, wherein
the ultrasonic oscillator has a circular shape, when seen in the plane, and
the ultrasonic collector has a circular shape, when seen in the plane.

5. The inspection apparatus according to claim 2, wherein
the second stage includes
a plate part including the second main face,
a first wall portion connected to an end of the plate part, and having a ring shape that surrounds the plate part, when seen in the plane, and
a second wall portion rising up in a direction perpendicular to the second main face, from an outer end of the first wall portion, and having a ring shape that surrounds the plate part, when seen in the plane.

6. The inspection apparatus according to claim 1, wherein
the first stage has a rectangular shape, when seen in a plane,
the second stage has a rectangular shape, when seen in the plane,
the first region is provided with the plurality of ultrasonic oscillators disposed in a check pattern, and
the second region is provided with the plurality of ultrasonic collectors disposed in a check pattern.

7. The inspection apparatus according to claim 1, wherein
the first stage has a rectangular shape, when seen in a plane,
the second stage has a rectangular shape, when seen in the plane,
the first region is provided with the plurality of ultrasonic oscillators disposed in a concentric pattern, and
the second region is provided with the plurality of ultrasonic collectors disposed in a concentric pattern.

8. The inspection apparatus according to claim 1, wherein
the first stage has a rectangular shape, when seen in a plane,
the second stage has a rectangular shape, when seen in the plane,
the first region includes
a first partial region, and
a second partial region disposed outside the first partial region,
the second region includes
a third partial region, and
a fourth partial region disposed outside the third partial region,
the first partial region is provided with a plurality of ultrasonic oscillators disposed in a check pattern,
the second partial region is provided with a plurality of ultrasonic oscillators disposed in a planar state,
the third partial region is provided with a plurality of ultrasonic collectors disposed in a check pattern, and
the fourth partial region is provided with a plurality of ultrasonic collectors disposed in a planar state.

9. The inspection apparatus according to claim 1, wherein
the second stage includes
a plate part including the second main face,
a first wall portion connected to an end of the plate part, and surrounding the plate part, when seen in a plane, and
a second wall portion rising up in a direction perpendicular to the second main face, from an outer end of the first wall portion.

10. The inspection apparatus according to claim 1,
further comprising a controller configured to create mapping information in which information concerning a difference between a reference value and a reaching time length from an ultrasonic oscillator to an ultrasonic collector is mapped in a two-dimensional state, in accordance with reference information and signals from the plurality of ultrasonic collectors.

* * * * *